(12) United States Patent
Nuss (10) Patent No.: US 11,441,606 B2
(45) Date of Patent: Sep. 13, 2022

(54) SLIDE BEARING AND ACCESSORY USING SAME WITH PIVOTALLY MOUNTED BEARING

(71) Applicant: Ralph Nuss, Poppenricht (DE)

(72) Inventor: Ralph Nuss, Poppenricht (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 17/070,408

(22) Filed: Oct. 14, 2020

(65) Prior Publication Data

US 2021/0207654 A1 Jul. 8, 2021

(30) Foreign Application Priority Data

Nov. 8, 2019 (DE) .......................... 102019130253.6

(51) Int. Cl.
*F16C 29/02* (2006.01)
*F16C 29/00* (2006.01)
*F16C 29/12* (2006.01)

(52) U.S. Cl.
CPC ............ *F16C 29/02* (2013.01); *F16C 29/002* (2013.01); *F16C 29/123* (2013.01)

(58) Field of Classification Search
CPC ........ F16C 29/002; F16C 29/02; F16C 29/12; F16C 29/123; F16C 31/02; F16C 2314/70; F16C 2326/08; B60N 2/763; B60N 2/773; B60N 2/777; B60N 2/78; B60N 2/783; B60N 2/79; B60N 2/793; A47C 7/541
USPC ........... 296/153; 297/411.21, 411.35, 411.37
See application file for complete search history.

(56) References Cited

U.S. PATENT DOCUMENTS

| 7,494,281 B2 * | 2/2009 | Hidaka ................. F16C 29/123 384/39 |
| 10,550,886 B2 | 2/2020 | Sweeney et al. |
| 2012/0049601 A1 | 3/2012 | von Rothkirch und Panthen et al. |
| 2017/0259714 A1 | 9/2017 | Mao et al. |
| 2019/0039482 A1 | 2/2019 | Roemer |

FOREIGN PATENT DOCUMENTS

| CH | 586589 A5 | 2/1977 |
| CH | 586589 * | 4/1977 |
| CH | 663373 A5 | 8/1985 |
| EP | 1614915 A2 | 1/2006 |
| EP | 1630434 A2 | 3/2006 |
| FR | 2207550 A5 | 6/1974 |
| WO | WO2018013169 * | 1/2018 |

* cited by examiner

*Primary Examiner* — James Pilkington
(74) *Attorney, Agent, or Firm* — Andrew Wilford (57) ABSTRACT

A slide bearing for guiding a translationally movable sliding part has a first part having a first guide surface suitable for interacting with a first sliding surface of the sliding part and a second part having a second guide surface suitable for interacting with a second sliding surface of the sliding part. The second part is movable relative to the first part. A guide part is connected to the first part so as to be movable in a first direction and a second direction. A pressure device urges the second part toward the first guide surface such that the first guide surface directly engages the first sliding surface and the second guide surface directly engages the second sliding surface.

12 Claims, 8 Drawing Sheets

SLIDE BEARING AND ACCESSORY USING SAME WITH PIVOTALLY MOUNTED BEARING

CROSS REFERENCE TO RELATED APPLICATION

This application claims the priority of German patent application 10 2019 130 253.6 filed 8 Nov. 2020.

FIELD OF THE INVENTION

According to a first aspect, the invention relates to a slide bearing.

BACKGROUND OF THE INVENTION

A slide bearing of this kind is known from public prior use. For example, the slide bearing has a first bearing element and a second bearing element opposite the first bearing element. For example, a bar of the sliding part, such as an arm support of an armrest, is movably guided for straight-line movement between the two bearing elements. In order to ensure the movability and simple assembly, a clearance was provided between the first bearing element and the second bearing element. This resulted in the accessory being able to move in accordance with the clearance between the abutment against the first bearing element and the abutment against the opposite second bearing element, with undesired noise being produced. Furthermore, the user haptically perceived the clearance when moving the accessory.

OBJECT OF THE INVENTION

The object of the invention was to provide a slide bearing that ensured that it was easy to move the accessory but largely prevented any clearance. Furthermore, an angular offset or an angular change of a movable sliding part can be compensated for by means of the slide bearing.

SUMMARY OF THE INVENTION

The object was achieved by a slide bearing having a first guide surface that interacts with a first sliding surface of the movable sliding part, and a second guide surface that interacts with a second sliding surface of the sliding part, the first guide surface and the second guide surface being arranged opposite one another. The second part, to which the second guide surface is carried, is movable relative to the first part, by which the first guide surface is carried, within a clearance range. The second part is pressed by a pressure device, e.g. a spring, toward the first guide surface such that the first guide surface is in contact with the first sliding surface and the second guide surface is in contact with the second sliding surface. The contact pressure of the pressure device can be selected according to the requirements. The sliding surfaces are formed on a linearly extending bar, for example. The bar is e.g. received between the guide surfaces and is constantly in contact with the guide surfaces.

The advantage of the invention is that undesired noise is prevented from being produced by a clearance of the sliding part between the guide surfaces of opposite bearing elements. This means that, by means of the slide bearing according to the invention, both the clearance between the sliding part and the first guide surface and the clearance between the sliding part and the second guide surface are prevented. Furthermore, the mounting of the sliding part appears to be of higher quality overall in terms of haptics, since the user does not perceive any clearance of the sliding part in the form of the sliding part wobbling during the movement.

At least one guide surface is planar or curved, for example, for guiding a sliding surface. This means that the contact surface between the sliding surface and the guide surface may be formed by a planar surface or by a curved surface. The interacting surfaces may be in contact over a large area or only over a small area. If the guide surface is curved, it can be curved in a convex or concave manner, for example. With a convex curvature, there may be point contact or linear contact with the sliding surface. With a concave curvature, extensive contact with a complementary shape of the sliding surface is formed, for example.

The first guide surface and the second guide surface are parallel to one another, for example. In this case, large-area guidance of the sliding part can be ensured. In this way, linear contact both of the first guide surface and of the second guide surface with the relevant sliding surface can also be ensured.

The second part may be directly or indirectly mounted on the first part, for example. In this case, the slide bearing can be mounted as a module, it being possible for the first guide surface and the second guide surface to already have been pre-adjusted. This facilitates mounting on a device comprising a sliding part, since the guide surfaces no longer have to be adjusted to one another. According to a simple alternative embodiment, however, the second part could also be mounted on a part that is separate from the first part.

For example, a separate guide part is connected to the first part, on which the second part is movably mounted.

The guide part may be movably connected to the first part, for example. The guide part is, for example, movable relative to the first part in the same movement directions as the second part. The guide part is e.g. guided on the first part so as to be linearly movable. The pressure device e.g. loads bearing surfaces of the guide part and the first part against wall regions of the bearing seat that interact with the bearing surfaces. The first part and the guide part are loaded in opposite directions, for example. For example, the pressure device loads the guide surfaces of the first part and the second part in contact with the sliding part and also loads the bearing surfaces of the guide part and the first part against the wall regions of the bearing seat that interact with the bearing surfaces. The multiple-part nature and relative movability of the components of the bearing has the advantage that not only is the clearance between the slide bearing and the sliding part eliminated, but also any clearance between the slide bearing and the bearing seat is prevented.

The shape of the outer surfaces of the slide bearing that interact with the wall regions of the bearing seat is not essential to the invention, as a rule. This is not the case if the bearing is intended to be rotatably received in its bearing seat. In this case, the outer surfaces and the mating surfaces of the bearing seat that interact with the outer surfaces have to allow for rotation. This will be described in greater detail below. Otherwise, the outer surfaces and the mating surfaces can interact in any way in order to hold the slide bearing in its bearing seat. By means of an interlocking fit, the slide bearing can e.g. be fixed in its seat such that compensation for clearance between the slide bearing and the bearing seat is possible. By the outer surfaces of the first part and the guide part and the respective mating surfaces forming a conically tapering structure, for example, the bearing can be centered in the X-Z plane (within the meaning of this application).

According to another embodiment, the first part or the separate guide part has first guide means and the second part has second guide means for guiding the movement of the second part relative to the first part. One guide means may e.g. be formed by cylindrical pins and the other guide means may be formed by recesses whose walls provide guide surfaces for guiding the pins within the movement clearance range of the second part. The recesses may e.g. be complementary to the pins. The pins may have any cross section, e.g. round, triangular, rectangular, or polygonal.

Alternatively, other guides can also be used for translationally guiding the second part. The second part is therefore guided relative to the first part without the risk of becoming jammed.

For example, the first part or the separate guide part has first limiting means and the second part has second limiting means for limiting the relative movement of the second part relative to the first part. The limiting means may e.g. be formed by stops of the second part against the first part or the separate guide part and, in this way, specify the first end region of the movement and the second end region of the movement of the second part. In this way, the movement of the second part relative to the first part or relative to the guide part can be limited such that, on one hand, the second part only performs a slight movement counter to the force of the pressure device under a large load and, on the other hand, it is possible to mount the sliding part in the bearing in a simple manner, because a minimum distance is formed between the guide surfaces and the distance between the guide surfaces does not need to be considerably enlarged when mounting the sliding part.

According to another embodiment, the first limiting means and/or the first guide means that are mounted on the first part, on the guide part. This embodiment makes it possible to mount the slide bearing in a simple manner, since the second part can first be mounted on the guide part and the module can then be mounted on the first part.

For example, the first part has a bearing seat for receiving the guide part. The bearing seat may be configured as a linear guide, for example. The guide part and the first part may e.g. comprise interacting guide means enabling movement of the guide part on the first part in opposite directions. First movement-limiting means that on the first part, and second movement-limiting means that on the guide part, can prevent the parts from becoming detached, for example. For example, one movement-limiting means can be formed by an arm having a stop surface and the other movement-limiting means can be formed by a mating surface, the stop surface and mating surface interacting such that a movement in the detaching direction out of the bearing seat is prevented. Alternatively, the other latching means can also be formed by a wall, behind which the projection engages. At this point, however, other alternative movable approaches to mounting the guide part on the first part, in particular linear guides, can also be used.

At least one chamfer that makes it easier to mount the sliding part between the guide surfaces, can be formed on the first part and/or on the second part so as to be adjacent to the guide surface. In order to ensure that the guide surfaces are securely positioned, the distance between the first guide surface and the second guide surface in the starting position of the second part, i.e. when a sliding part is not positioned between the guide surfaces, has to be lower than the distance between the sliding surfaces. In other words, during the mounting the second part is moved slightly counter to the spring force of the pressure device, meaning that the distance between the guide surfaces increases. In order to make it easier to move the sliding surfaces between the guide surfaces when mounting the sliding part, the chamfer is provided that deflects a force directed transversely to the movement direction of the second part, in a direction that is directed parallel thereto.

According to an embodiment, at least one region of the outer surface of the slide bearing is circular cylindrical or spherical. If there is a complementary circular cylindrical or complementary spherical receptacle for the bearing in a bearing seat, a rotational movement of the slide bearing in the receptacle is possible. In this way, an angular offset or an angular change of the sliding part can be compensated for, for example. The rotatably mounted outer surfaces of the slide bearing are arranged so as to be spaced apart from the center of rotation, for example. Overall, the bearing has a cylindrical shape, in particular a circular cylindrical shape, for example. For example, one of the guide surfaces can be moved radially relative to a central longitudinal axis of the circular cylinder.

According to another configuration of the invention, when viewed in the movement direction of the sliding part, the slide bearing has an approximately C-shaped design, with an opening for receiving the sliding surfaces of the sliding part.

The first part, the second part and the guide part may e.g. be made of sliding-bearing materials, preferably plastics material, or of materials that are modified for sliding. All suitable materials are taken into consideration.

According to a second aspect, the invention also has an accessory comprising a sliding-bearing device that has at least one slide bearing, in particular two or four slide bearings, with the slide bearing being configured according to the first aspect of the invention. In this way, a larger sliding part, such as an arm support of armrest, can be mounted relative to a base part of the armrest, with the bearings each being received in their bearing seats without any clearance and the accessory being guided in the slide bearing without any clearance, for example.

For example, an accessory of a vehicle may comprise a sliding-bearing device of this kind. The accessory has a base and a sliding part that is movable relative to the base. The sliding part is slidably mounted on the base. In order to guide the sliding part, the base has bars, for example, with each bar being movably mounted in a slide bearing according to the invention in the X direction in accordance with the first aspect of the invention, while a movement in the Z direction and the Y direction is substantially not possible. Each slide bearing is retained in a bearing seat of the sliding part. For example, the base has at least one bar on opposite sides and the sliding part has two bearing seats on two opposite sides in each case, in which bearing seats a slide bearing is arranged such that it is possible for the sliding part to move in two opposite directions. Alternatively, the bars can also be arranged on the sliding part and the slide bearings on the base, the accessory otherwise being configured in an identical manner. In this way, the sliding part is mounted without clearance between the guide surfaces of the slide bearing and, for example, the slide bearing is additionally received in the bearing seat without clearance.

According to a third aspect, the invention relates to an accessory that is essentially constructed in a manner corresponding to the second aspect, but at least one bearing of the sliding-bearing device is movably received in the bearing seat and can be formed by any conceivable type of bearing, but is in particular formed by the bearing according to the invention in accordance with the first aspect. This is possible, for example, when, at least in one region, the bearing forms a circular cylindrical or spherical outer surface and the receptacle forms a complementary surface that is circular cylindrical or spherical at least in portions. The bearing seat is formed in the base, or alternatively in the sliding part. The advantage is that this can compensate for an angular offset or angular changes in the guidance of the sliding part, with the sliding part being mounted in the bearing without any clearance. In particular, the slide bearing is also mounted in the bearing seat without any clearance.

Embodiments of the invention are described by way of example in the following description of the figures, also with reference to the schematic drawings. Here, for the sake of clarity, even if different embodiments are involved, identical or comparable parts or elements have been denoted by identical reference signs, sometimes with the addition of lower-case letters.

Features that are only described, set out or disclosed in relation to one embodiment can also be provided in any other embodiment of the invention within the scope of the invention. Even if they are not shown in the drawings, such amended embodiments are covered by the invention.

All the features disclosed are essential to the invention per se. The content of the disclosure of the cited documents and the prior art devices described are hereby incorporated into the disclosure of the application in their entirety, also for the purpose of incorporating individual features or a plurality of features of the subjects disclosed therein into one or more claims of the present application. Even if they are not shown in the drawings, such amended embodiments are also covered by the invention.

BRIEF DESCRIPTION OF THE DRAWING

Other advantages become apparent on the basis of the description of an embodiment that is schematically described in the drawings, in which.

SPECIFIC DESCRIPTION OF THE INVENTION

The slide bearing as a whole is denoted by reference sign 10 in the drawings. The slide bearing 10 is provided for mounting and guiding a movable part, referred to in the following as a sliding part, relative to a base of a device, such as a vehicle accessory.

The slide bearing 10 has a first part 11 having a first guide surface 12. The guide surface 12 is planar and is approximately rectangular in the present case. However, it could alternatively also be another shape and/or be bent. The guide surface 12 extends in the movement direction $x_1$ and $x_2$ and at right angles thereto in the direction $y_1$ and $y_2$. The first part 11 can be seen in FIGS. 1 to 4, for example. It has a planar functional region 13 that serves to fasten the slide bearing 10 e.g. to a device, e.g. to a vehicle accessory, and to guide and mount a second part 14 whose function is described in greater detail below. The functional region 13 substantially extends approximately at right angles to the guide surface 12 in an X-Z plane.

In the present embodiment, the functional region 13 has a bearing seat 17 (see FIG. 2) for a guide part 15 guided in a manner fastened to the first part 11 so as to be movable in the directions $z_1$ and $z_2$. The guide part 15 is provided for mounting and guiding the second part 14. The bearing seat 17 has a recess 47 having two opposite guide bars 18a and 18b adjoining the recess 47 and carrying the guide part 15 in its bearing seat 17. Latching arms 19a and 19b fasten the first part 11 and thus the entire slide bearing 10 to a device, are formed on a rear side 16 of the first part 11. In addition, the first part 11 has a movement limiter 20 comprising a shoulder 24 for retaining the guide part 15 on the first part 11 in a captive manner.

A chamfer 21 is formed adjacent to the guide surface 12. This makes it easier to mount the sliding part intended to be slidably guided.

The first part 11 is cylindrical and, in the present embodiment, has a first region 22 of an outer surface that is formed as a semicircle having a first radius and has a second region 23 of the outer surface formed by a semicircle having a second radius. Alternatively, the outer surface could not be formed by regions with different radii, but instead could be formed to be completely circular with one radius. Here, the regions having different radii merely have the purpose of preventing incorrect installation.

The shape of the outer surface (22 and 23 here) merely plays a role in applications in which the bearing 10 is intended to be received movably in a bearing seat for tolerance compensation between the sliding part and slide bearing 10 or in angled guides. If the slide bearing is installed immovably in a bearing seat, the slide bearing can also have other shapes of the outer surface, e.g. a hexagonal form, and the bearing seat can have a complementary shape. In this case, the slide bearing 10 is centered in the X-Z plane by the oblique surfaces of the hexagon.

The second part 14 is in the form of a sliding shoe that is linearly movable in the directions $z_1$ and $z_2$. The second part 14 has a second guide surface 26 arranged opposite the first guide surface 12 and in parallel therewith. A chamfer 35 is formed adjacently to the guide surface 26, which chamfer makes it easier to mount the sliding part to be guided.

Figure 1:
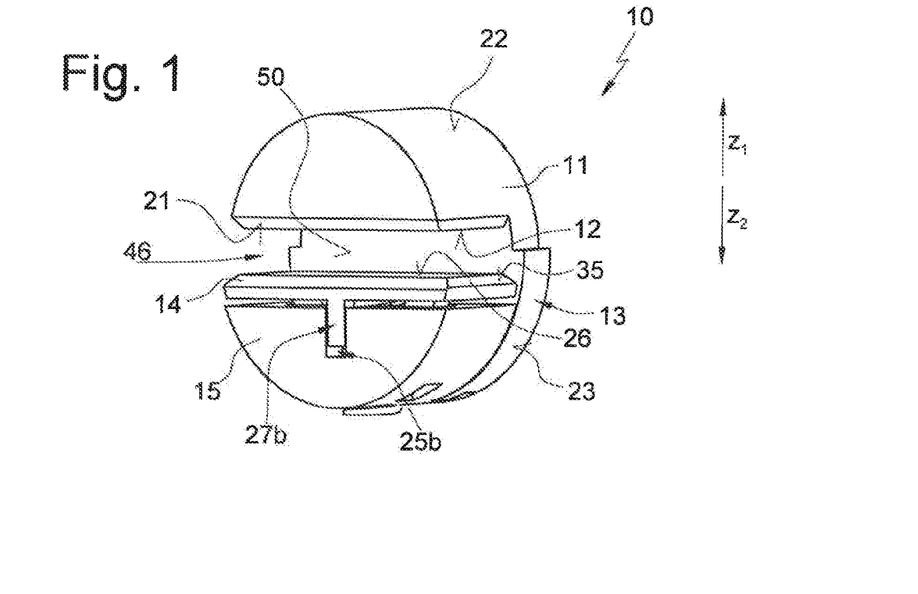
FIG. 1 is an oblique perspective front view of a slide bearing according to the invention.
Figure 2:
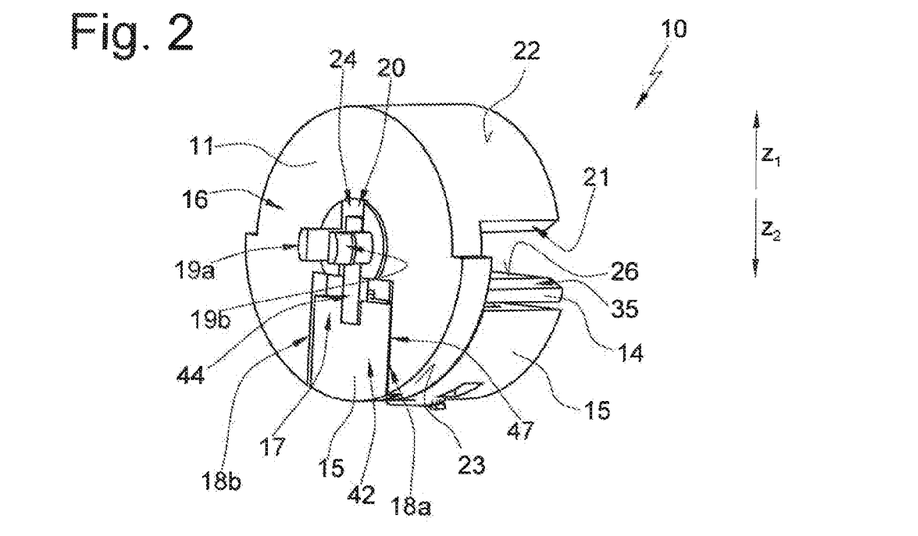
FIG. 2 is an oblique perspective rear view of the slide bearing according to FIG. 1.
Figure 3:
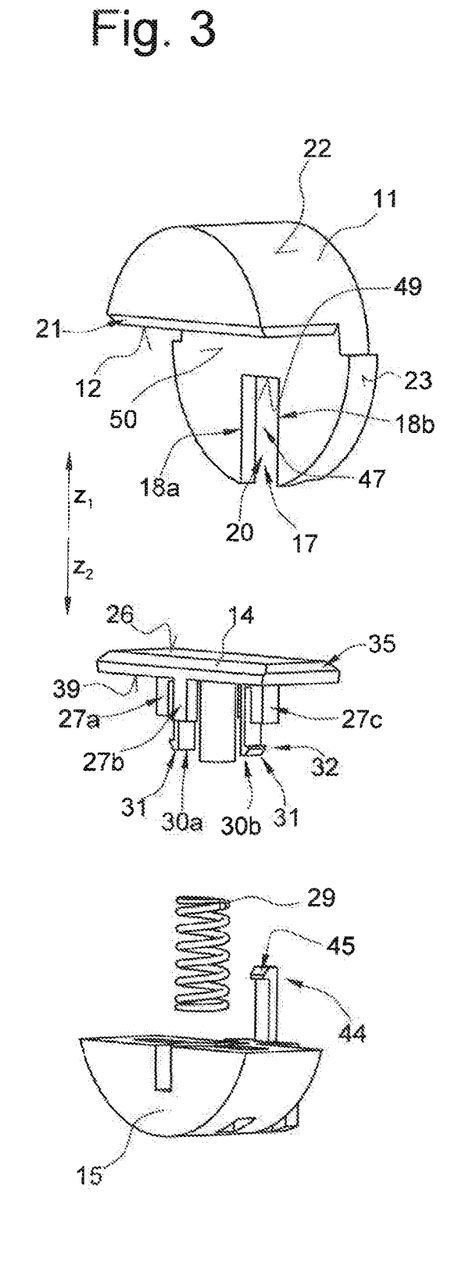
FIG. 3 is an oblique perspective exploded front view of the slide bearing.
Figure 4:
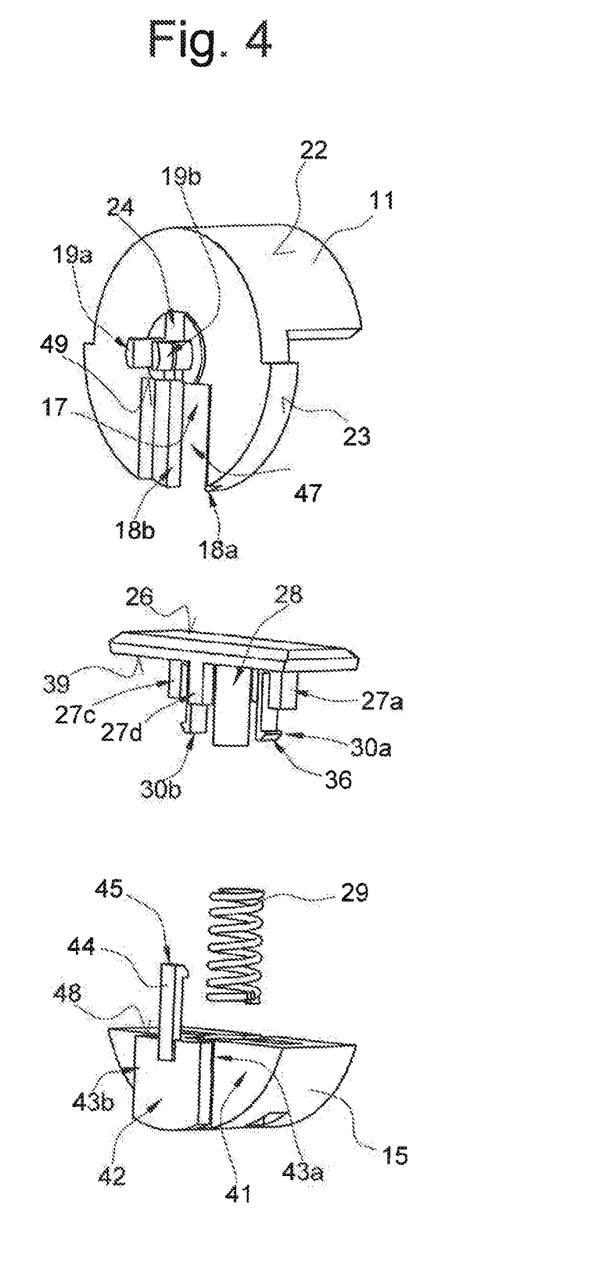
FIG. 4 is an oblique perspective exploded rear view of the slide bearing.
Figure 5:
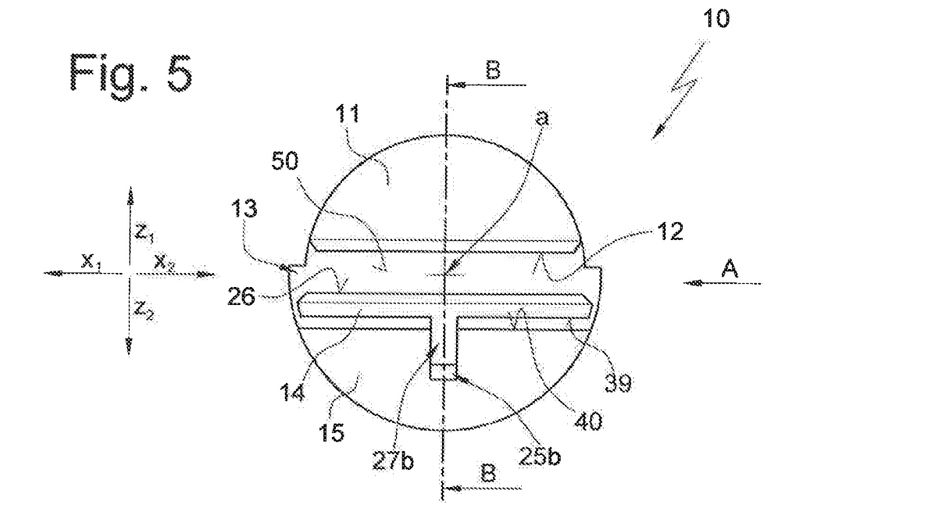
FIG. 5 is a front view of the slide bearing.
Figure 6:
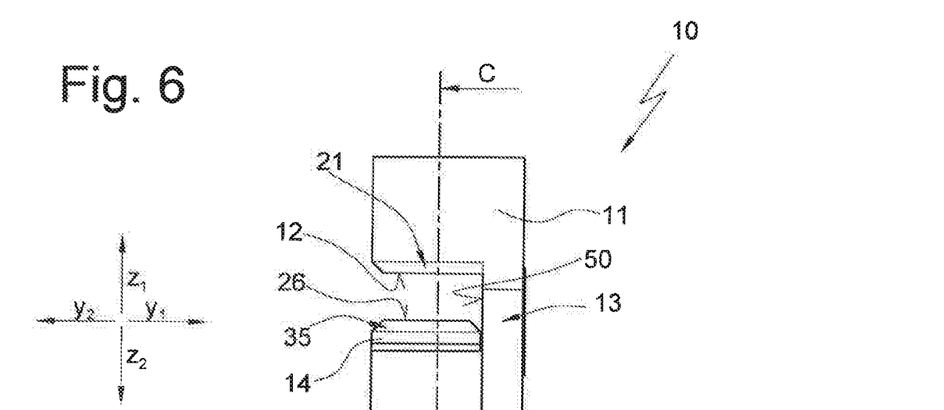
FIG. 6 is a view from the direction of the arrow A in FIG. 5.

Furthermore, the second part 14 has four guide pins 27a, 27b, 27c and 27d that are approximately at right angles to the guide surface 26 and can be seen in FIGS. 3 and 4, for example. The guide pins 27a, 27b, 27c and 27d are rectangular in cross section, but could alternatively also have another cross-sectional shape, such as round, triangular, square, or polygonal. The guide pins 27a, 27b, 27c and 27d are arranged at a distance from one another.

A bearing pin 28 projects approximately at right angles to the guide surface 26 and acts as a mount for a spring 29 that loads the second part 14 in a direction $z_1$ such that the second guide surface 26 is pressed into contact with the sliding part to be mounted. Therefore, the spring 29 loads a sliding part mounted between the guide surfaces 12 and 26 against the guide surface 12.

Travel limiters 30a, 30b that project approximately at right angles to the guide surface 26 in the form of pins, are formed on the second part 14. The travel limiters 30a, 30b comprise hook structures 32 at a free end region 31. In addition, the travel limiters 30a and 30b each comprise a mounting bevel 36, which facilitates mounting on the guide part 15, at the free end region 31.

Figure 7:
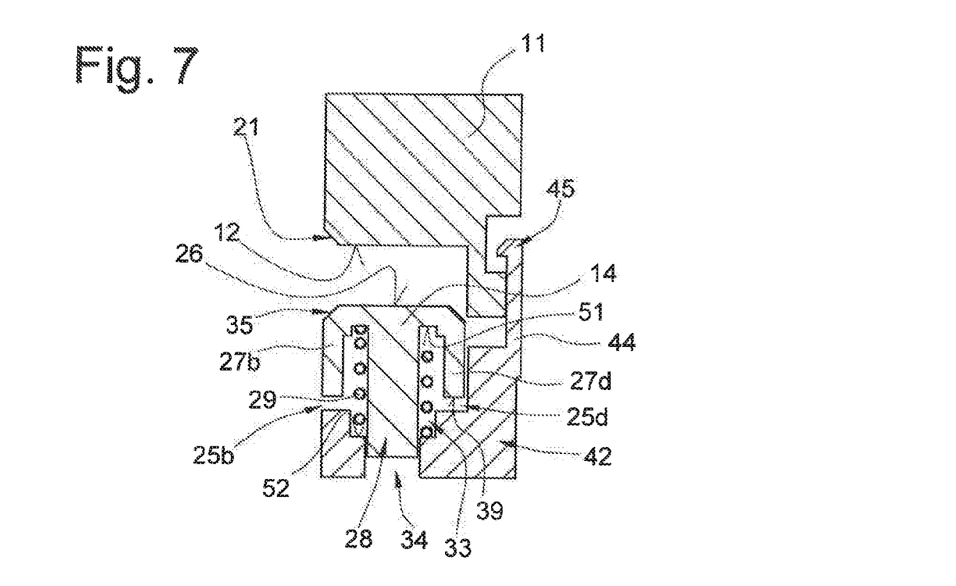
FIG. 7 is a sectional view along sectional line B-B in FIG. 5.
Figure 8:
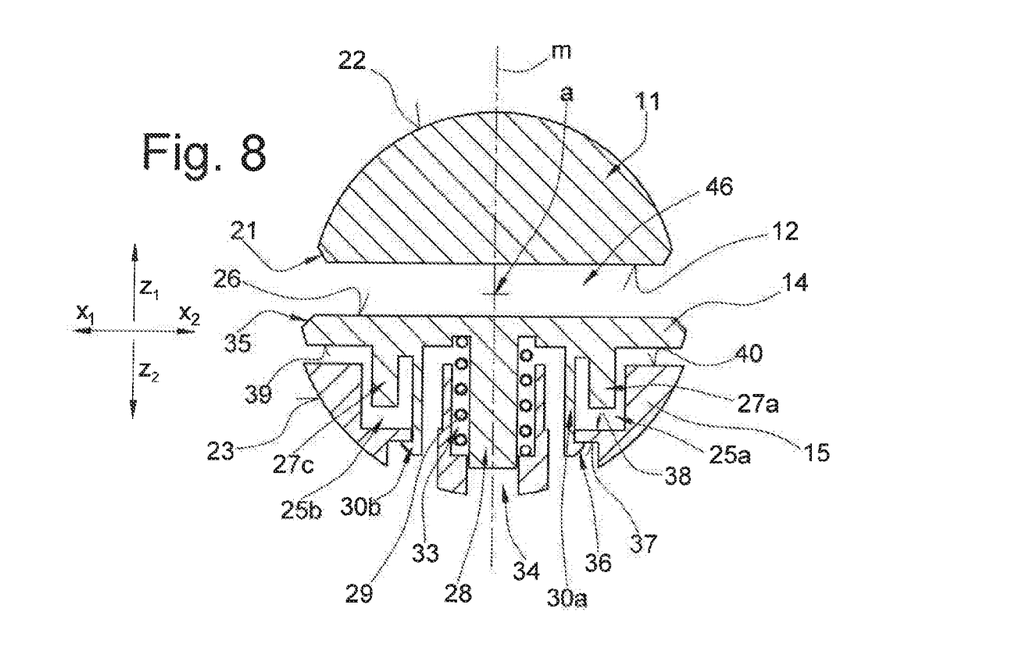
FIG. 8 is a sectional view along sectional line C-C in FIG. 6.

The guide part 15 has a corresponding recess 25a, 25b, 25c and 25d for each guide pin 27a, 27b, 27c and 27d in order to guide the second part 14 on the guide part 15. Walls of the recesses 25a, 25b, 25c and 25d interact with the guide pins 27a, 27b, 27c and 27d and thus guide the second part 14 when it moves between a first end position and a second end position, such that the sliding part can be moved without becoming jammed. In addition, the guide part 15 has a spring seat 33 (see e.g. FIGS. 7 and 8) and a guide recess 34 for receiving the bearing pin 28.

On a rear side 41, the guide part 15 has a projection 42 on which guide grooves 43a and 43b are formed. The guide grooves 43a and 43b are parallel. A movement limiter 44 is retained on the projection 42 and, in the present case, is formed by an arm that is provided at a free end region with a hook structure 45 having a stop surface that interacts with the shoulder 24 of the first part such that the movement of the guide part 15 relative to the first part 11 in the directions $z_1$ and $z_2$ is limited. This means that, after mounting, the guide part 15 can no longer accidentally become detached from the first part 11. This movement limitation of the guide part 15 relative to the first part 11 could alternatively also be dispensed with, since it is not essential to the invention.

The slide bearing 10 is mounted as follows. First, the second part 14 is mounted on the guide part 15 (see e.g. FIG. 8). To do this, the spring 29 is placed onto the bearing pin 28 and the guide pins 27a, 27b, 27c and 27d are inserted into the corresponding recesses 25a, 25b, 25c and 25d far enough that the mounting bevels 36 of the travel limiters 30a, 30b come into contact with a wall 38 of the guide part 15.

When pushed further in the direction $z_2$, the free end regions 31a and 31b are resiliently deflected toward a central axis m of the slide bearing 10 and can thus be moved past the wall 38. The spring 29 is supported by an end region on a stop surface 52 of the spring seat 33 and by another end region on a stop surface 51 of the second part 14 such that the second part 14 is loaded in the direction $z_1$ into a first end position in which the hook structures 32 abut a rear surface 37 of the wall 38 (when a guide bar is not arranged between the guide surface 12 and the guide surface 26). Owing to the movement limitation, a minimum distance is maintained between the guide surface 12 and the guide surface 26 that makes it easier to mount guide means of the sliding part between the guide surfaces 12 and 26. The guide part 15 is loaded relative to the second part 14 by the spring in the direction $z_2$.

When the second part 14 is mounted on the guide part 15 (see e.g. FIGS. 5 to 8), it is possible to move the second part 14 relative to the guide part 15 counter to the force of the spring 29 in the direction $z_2$ until a lower surface 39 of the second part 14 comes into contact with a mating surface 40 of the guide part 15 in a second end position. As mentioned above, in the direction $z_1$ the movement of the second part 14 is limited by the contact of the hook structures 32 with the rear surfaces 38. In this movement range, the second part 14 is guided relative to the guide part 15 and on the guide part 15 without becoming jammed by the interacting guide surfaces of the guide pins 27a, 27b, 27c and 27d together with the walls of the recesses 25a, 25b, 25c and 25d.

The guide part 15 is then mounted on the first part 11 (see FIG. 4) by the projection 42 being arranged between the guide rails 18a and 18b adjoining the recess 47 such that the guide rails 18a and 18b engage in the guide grooves 43a and 43b in the bearing seat 17. The guide part 15 can be moved in the seat 17 in the directions $z_1$ and $z_2$ relative to the first part 11. In the direction $z_1$, it is possible for the guide part 15 to move relative to the first part 11 until an upper surface 48 of the projection 42 abuts a surface 49 adjacent to the recess 47. In the direction $z_2$, the movement of the guide part 15 relative to the first part 11 is limited by the contact between the stop surface of the hook structure 45 of the locking element 44 and the latching shoulder 24 of the first part 11.

The entire slide bearing 10 can then be latched in the bearing seat of a device, e.g. an accessory, by the latching arms 19a and 19b. By means of the opening 46, a bar of the sliding part can e.g. be arranged between the first guide surface 12 and the second guide surface 26. The bar is then movably guided by the slide bearing 10 in the directions $x_1$ and $x_2$ relative to the slide bearing 10 (see FIGS. 5 and 6). The bar is prevented from moving in the direction $y_1$ by the side surface 50.

An example of the use of the slide bearing 10 is shown in FIGS. 9a to 11.

Figure 9A:
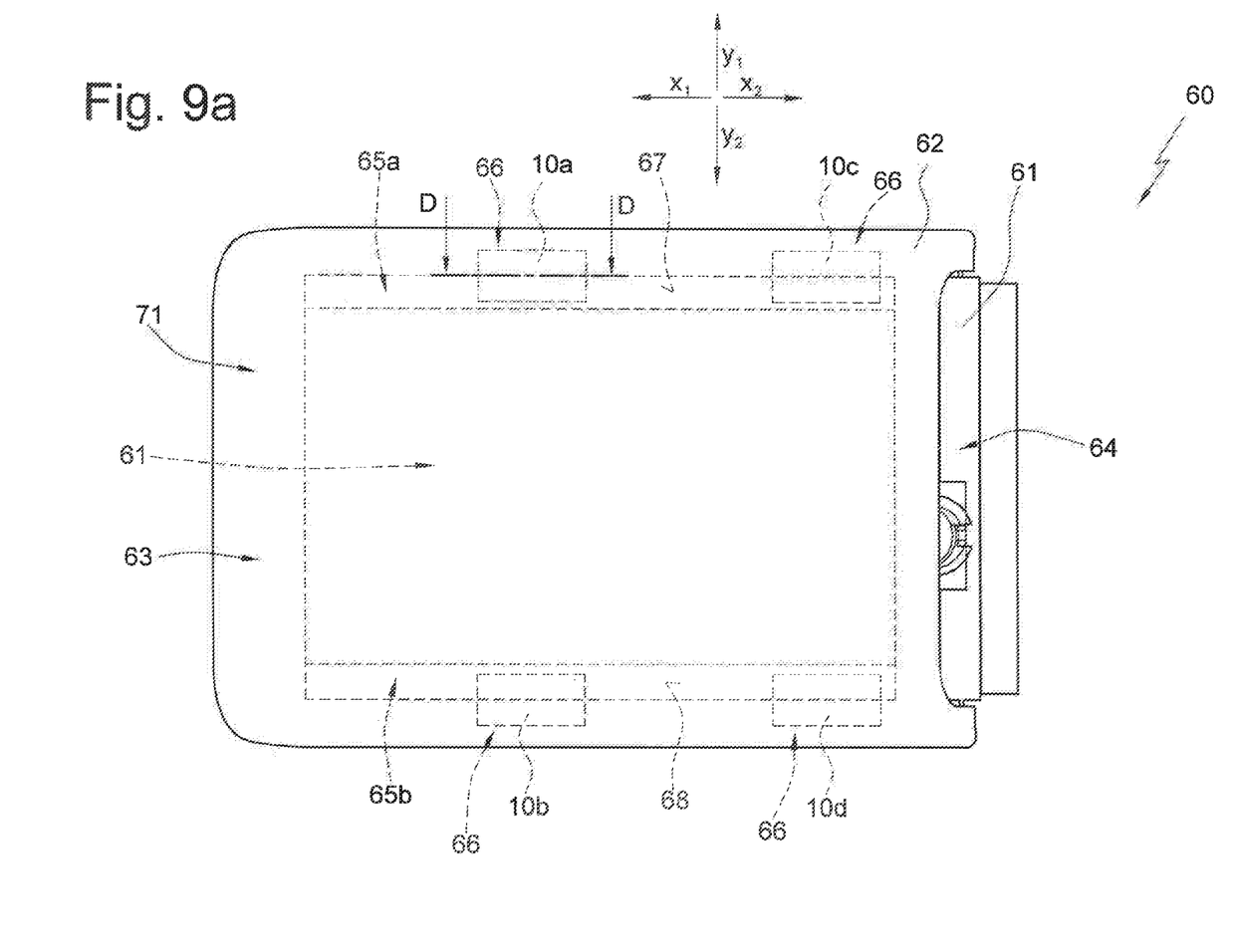
FIG. 9a is a plan view of an accessory comprising a sliding part mounted on a base so as to be linearly movable by means of four slide bearings according to the invention, the sliding part being in a first position.

FIG. 9a shows an accessory 60 for a vehicle, which part is formed by an armrest in the present example. The accessory 60 has a base 61 and a sliding part 62 that is movable relative to the base 61 in the directions $x_1$ and $x_2$ and is in the form of an arm support here. The base 61 is shown by dashed lines in FIGS. 9a and 9b, in which it is concealed by the sliding part. The sliding part 62 has a front end region 63 and a rear end region 64 and is slidably mounted on the base part 61 by a sliding-bearing device 71.

Figure 9B:
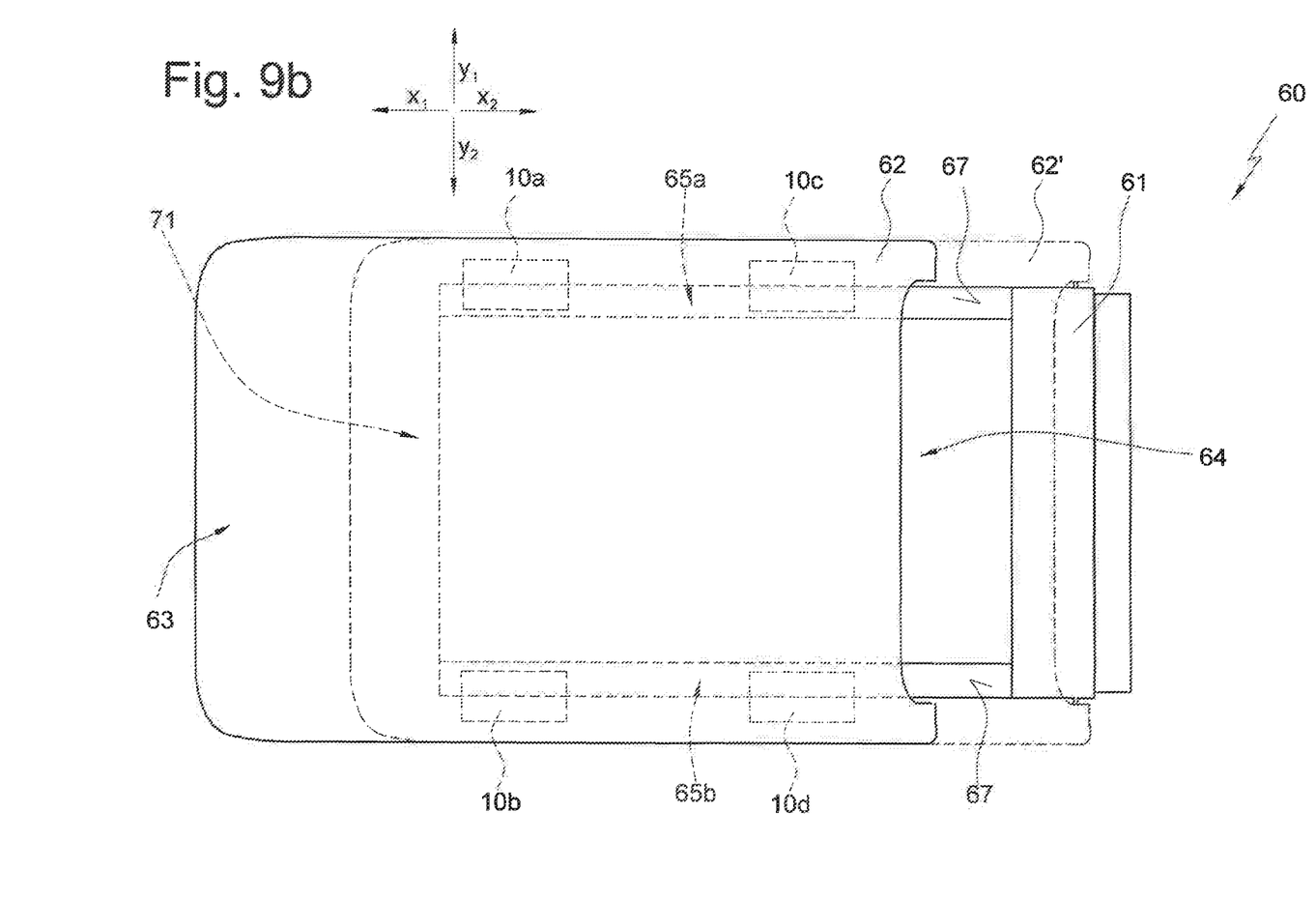
FIG. 9b is a plan view based on FIG. 9a, the sliding part being in a second position and the first position being shown by dashed lines.

The base 61 has bars 65a and 65b for guiding the sliding part 62, the bar 65a being mounted in the slide bearings 10a and 10c according to the invention and the bar 65b being mounted in the slide bearings 10b and 10d, each so as to be movable in the directions $x_1$ and $x_2$ between a first position (see FIG. 9a) and a second position (see FIG. 9b). The bars 65a and 65b extend substantially in a straight line in parallel with the movement direction of the sliding part 62. The slide bearings 10a, 10b, 10c and 10d are retained in bearing seats 66 of the sliding part 62 (see FIG. 10). Each slide bearing 10a, 10b, 10c and 10d corresponds to the slide bearing 10 of the first embodiment.

The slide bearing 10c is arranged in the same way as the bearing 10a. The slide bearings 10b and 10d are arranged so as to be mirrored with respect to the bearings 10a and 10c, i.e. the openings 46 in the slide bearings 10a, 10b, 10c and 10d point toward the sliding part 62, but are otherwise identical.

Figure 10:
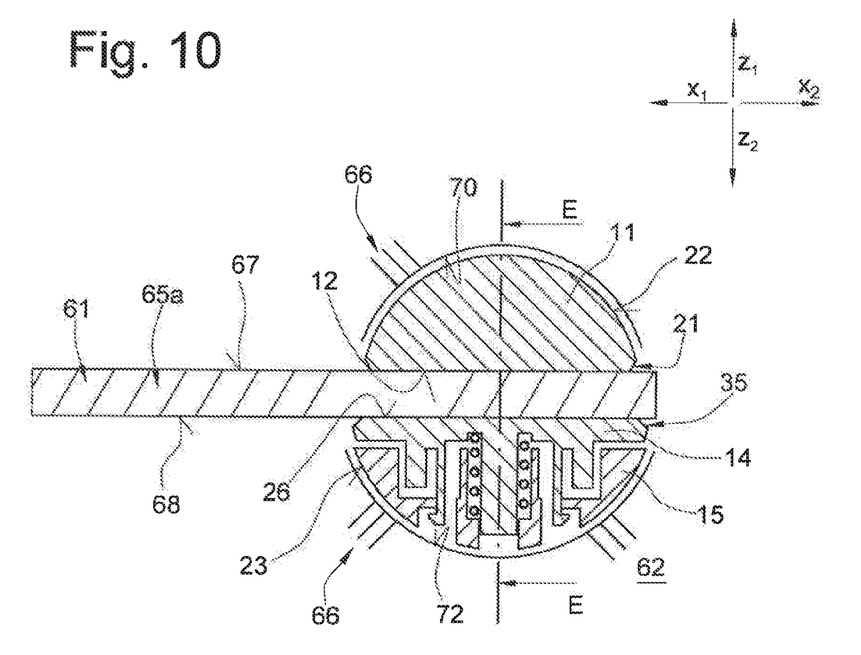
FIG. 10 is a sectional view along sectional line D-D in FIG. 9a, with just one guide bar on the base being shown.
Figure 11:
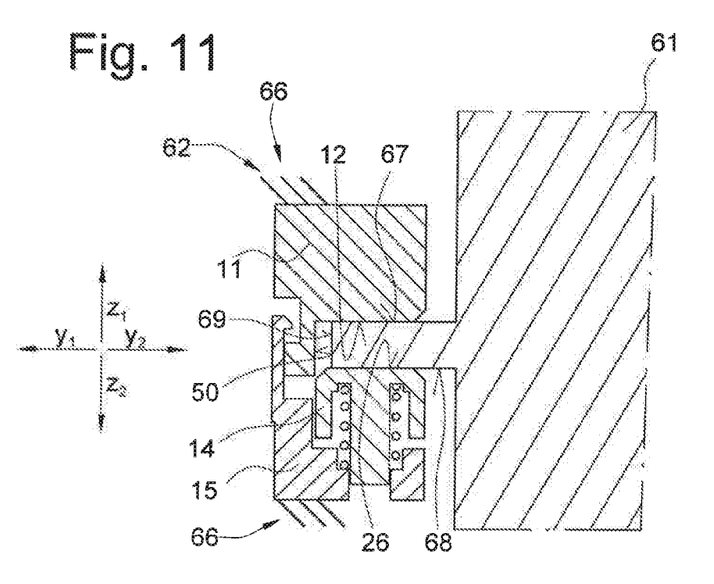
FIG. 11 is a sectional view along sectional line E-E in FIG. 10.

FIGS. 10 and 11 are sectional views of the slide bearing 10a comprising the bar 65a. The bar 65a has a first sliding surface 67 and a second sliding surface 68 that is opposite the first sliding surface 67. The spring 29 spreads the first part 11 and the guide part 15 apart in opposite directions. The second part 14 is loaded by the spring 29 in the direction $z_1$, as a result of which the second guide surface 26 abuts the second sliding surface 68 and the bar 65a is loaded in the direction $z_1$ such that the first sliding surface 67 is also retained on the first guide surface 12. The first guide surface 12 is loaded against a first surface region 70 of the bearing seat 66 in the direction $z_1$. At the same time, the spring 29 loads the guide part 15 in the direction $z_2$ against a second surface region 72 of the bearing seat 66 that is opposite the first wall region 70. The bar 65a is mounted by the sliding element 10a according to the invention without any clearance. The entire slide bearing 10 is additionally received in the bearing seat 66 without any clearance.

FIG. 11 shows that a lateral movement of the sliding part 62 is limited in the direction $y_2$ by the slide bearing 10a and 10c by an end face 69 of the bar 65a being guided by the side surface 50 of the first part 14. In the same way, a lateral movement is limited in the direction $y_1$ by the slide bearings 10b and 10d. The opposing slide bearings 10a and 10c as well as 10b and 10d prevent the movement of the arm support in the directions $z_1$ and $z_2$ and in the directions $y_1$ and $y_2$ and allow clearance-free movement of the arm support 62 in the directions $x_1$ and $x_2$.

Figure 12:
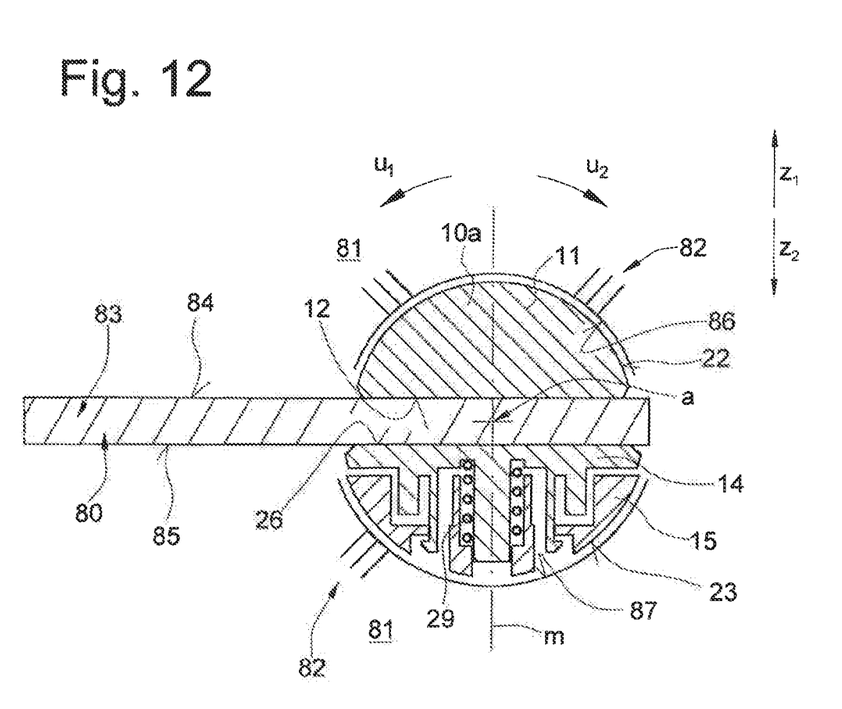
FIG. 12 is a sectional view of an accessory according to FIG. 10, with the bearing being arranged in the bearing seat so as to be rotatable about a center.

FIG. 12 shows an accessory comprising a bearing arrangement that corresponds to the embodiment in FIGS. 10 and 11, with the exception that the bearings 10a, 10b, 10c and 10d, of only the bearing 10a is shown here, are rotatably arranged in their bearing seats. The accessory has a base 80 and a sliding part 81 that is movable relative to the base 80. The sliding part 81 forms a plurality of bearing seats 82, of only one bearing seat 82 is shown here. A bearing 10a according to the invention is arranged in the bearing seat 82, in the same way as in the remaining bearing seats, and corresponds to the bearing 10 of the first embodiment according to FIGS. 1 to 9b. The bearings 10b, 10c and 10d are formed in the same way.

Guide bars 83 are arranged on the base 80, of which only one guide bar 83 is shown here. The guide bar 83 interacts with the bearing 10a such that a first sliding surface 84 of the guide bar 83 interacts with a first guide surface 12 of the bearing 10 and a second sliding surface 85 of the guide bar 83 interacts with a second guide surface 26 of the bearing 10. The bearing 10a is formed such that it is received in the bearing seat 82 of the sliding part 81 so as to be rotationally movable about a center a in the directions $u_1$ and $u_2$. To do this, the slide bearing 10a has the outer surface regions 22 of the first part 11 and 23 of the guide part 15, which regions are formed in a circular cylindrical manner around the center a, the outer surface region 22 interacting with a complementary surface region 86 and the outer surface region 23 interacting with a complementary surface region 87 of the bearing seat 82. In the same way as in the embodiment in FIGS. 10 and 11, the slide bearing 10 prevents any clearance between the guide surfaces 12 and 26 and the guide bar 83. Clearance between the slide bearing 10a and the bearing seat 82 is prevented by the spring 29 that spreads apart the first part 11 in the direction $z_1$ and the guide part 15 in the direction $z_2$ such that the outer surface region 22 is loaded so as to be in contact with the surface region 86 of the bearing seat 82 and the outer surface region 23 is loaded so as to be in contact with the surface region 87 of the bearing seat.

The invention claimed is:

1. A slide bearing for guiding a translationally movable sliding part, the bearing comprising:
a first part having a first guide surface suitable for interacting with a first sliding surface of the sliding part;
a second part having a second guide surface suitable for interacting with a second sliding surface of the sliding part, the second part being configured to be movable relative to the first part;
a guide part connected to the first part so as to be movable in a first direction and a second direction; and
a pressure device urging the second part toward the first guide surface such that the first guide surface directly engages the first sliding surface and the second guide surface directly engages the second sliding surface.

2. The slide bearing according to claim 1, wherein at least one of the first and second guide surfaces is planar or curved for guiding one of the sliding surfaces.

3. The slide bearing according to claim 1, wherein the first guide surface and the second guide surface are parallel to one another.

4. The slide bearing according to claim 1, wherein the second part and the first part are mounted on one another such that the second part can be moved relative to the first part.

5. The slide bearing according to claim 1, wherein chamfers that make it easier to mount the sliding part between the guide surfaces are formed on the first part and/or on the second part so as to be adjacent to the guide surface.

6. The slide bearing according to claim 1, wherein at least one region of an outer surface of the slide bearing is at least partly cylindrical or spherical.

7. The slide bearing according to claim 1, wherein, viewed in a movement direction of the sliding part, the slide bearing has an approximately C-shape with an opening for receiving the sliding surfaces.

8. An accessory comprising:
a base;
a slide bearing;
a sliding part mounted for translational movement relative to the base by the slide bearing,
a bar having a first sliding surface and a second sliding surface,
a bearing seat of the slide bearing, the slide bearing having a first guide surface and a second guide surface, the slide bearing having a first part having the first guide surface suitable for interacting with the first sliding surface;
a second part having the second guide surface suitable for interacting with the second sliding surface, the second part being configured to be movable relative to the first part; and
a pressure device urging the second part toward the first guide surface such that the first guide surface directly engages the first sliding surface and the second guide surface directly engages the second sliding surface, the slide bearing being on the sliding part or on the base and the bar being on the other element of sliding part or base.

9. An accessory comprising:
a base;
a slide bearing;
a sliding part mounted for translational movement relative to the base by the slide bearing,
a bar having a first sliding surface and a second sliding surface, a bearing seat of the slide bearing, the slide bearing having a first guide surface and a second guide surface, a first part of the slide bearing having the first guide surface suitable for interacting with the first sliding surface, a second part of the slide bearing having the second guide surface suitable for interacting with the second sliding surface, the second part being configured to be movable relative to the first part, a guide part of the slide bearing movable relative to the first part and to the second part; and a pressure device urging the second part and the third part away from each other and thereby urging the second part toward the first guide surface such that the first guide surface directly engages the first sliding surface and the second guide surface directly engages the second sliding surface, and such that the guide part is pressed against a surface of the bearing seat, the slide bearing being on the sliding part or on the base and the bar being on the other element of sliding part or base.

10. An accessory comprising:
a base part;
a slide bearing;
a sliding part mounted for translational movement relative to the base part and slidable supported by the slide bearing;

a first part of the slide bearing having a first guide surface suitable for interacting with a first sliding surface;

a second part of the slide bearing having a second guide surface, suitable for interacting with a second sliding surface, and configured to be movable relative to the first part;

a pressure device urging the second part toward the first guide surface such that the first guide surface directly engages the first sliding surface and the second guide surface directly engages the second sliding surface; and a bar that has the first sliding surface and the second sliding surface, the slide bearing being fixed or movable in a bearing seat, the slide bearing being on one of the sliding part or the base part and the bar being on the other of the sliding part or base part.

11. The accessory according to claim 10, wherein the slide bearing is received in the bearing seat so as to be rotatable.

12. The accessory according to claim 10, wherein an outer surface of the slide bearing is at least partly cylindrical or spherical at least in regions and the bearing seat of the slide bearing is complementary to the outer surface at least in regions.

* * * * *